(12) United States Patent
Abt et al.

(10) Patent No.: US 10,302,162 B2
(45) Date of Patent: May 28, 2019

(54) DISK BRAKE FOR A UTILITY-VEHICLE WHEEL

(71) Applicant: BPW Bergische Achsen KG, Wiehl (DE)

(72) Inventors: Christian Abt, Gummersbach (DE); Michael Pehle, Leverkusen (DE); Georg Goyke, Nümbrecht (DE)

(73) Assignee: BPW BERGISCHE ACHSEN KG, Wiehl (DE)

( * ) Notice: Subject to any disclaimer, the term of this patent is extended or adjusted under 35 U.S.C. 154(b) by 0 days.

(21) Appl. No.: 15/547,897

(22) PCT Filed: Feb. 1, 2016

(86) PCT No.: PCT/DE2016/100039
§ 371 (c)(1),
(2) Date: Aug. 1, 2017

(87) PCT Pub. No.: WO2016/124174
PCT Pub. Date: Aug. 11, 2016

(65) Prior Publication Data
US 2018/0017116 A1 Jan. 18, 2018

(30) Foreign Application Priority Data
Feb. 2, 2015 (DE) .................. 10 2015 101 468

(51) Int. Cl.
F16D 65/18 (2006.01)
F16D 55/226 (2006.01)
(Continued)

(52) U.S. Cl.
CPC ........... *F16D 65/18* (2013.01); *F16D 55/226* (2013.01); *F16D 65/183* (2013.01);
(Continued)

(58) Field of Classification Search
CPC ...... F16D 65/18; F16D 55/226; F16D 63/183; F16D 2121/08; F16D 2121/14;
(Continued)

(56) References Cited

U.S. PATENT DOCUMENTS

2005/0241894 A1* 11/2005 Baumgartner ........ F16D 65/567
188/79.51
2011/0147139 A1* 6/2011 Baumgartner ........ B60T 17/088
188/72.1
2015/0314758 A1 11/2015 Carle

FOREIGN PATENT DOCUMENTS

DE 19525722 A1 1/1997

* cited by examiner

Primary Examiner — Melanie Torres Williams

(57) ABSTRACT

A disk brake for a utility-vehicle wheel includes a brake caliper reaching around a brake disk, an application device arranged in the brake caliper on one side of the brake disk actuated by means of a force member, brake pads on both sides of the brake disk. At least the application-side brake pad is arranged in a pad duct having first and second supporting surfaces which have the same distance from a pad duct center line in the circumferential direction, and against which the brake pad lies, a brake lever which is part of the application device and is composed of a lever arm supporting the force member, and an application shaft connected to the lever arm and mounted inside the brake caliper on a pivot axis and resting in a rotationally movable manner against a pressure piece working against the application-side brake pad.

10 Claims, 3 Drawing Sheets

(51) Int. Cl.
*F16D 121/14* (2012.01)
*F16D 125/26* (2012.01)
*F16D 125/58* (2012.01)
*F16D 121/08* (2012.01)
*F16D 125/28* (2012.01)

(52) U.S. Cl.
CPC ...... *F16D 2121/08* (2013.01); *F16D 2121/14* (2013.01); *F16D 2125/26* (2013.01); *F16D 2125/28* (2013.01); *F16D 2125/58* (2013.01)

(58) Field of Classification Search
CPC ............. F16D 2125/26; F16D 2125/28; F16D 2125/58; F15D 55/14
See application file for complete search history.

DISK BRAKE FOR A UTILITY-VEHICLE WHEEL

CROSS-REFERENCE TO RELATED APPLICATIONS

This application is a national stage application under 35 U.S.C. 371 of PCT Application No. PCT/DE2016/100039 having an international filing date 1 Jan. 2016, which PCT application claimed the benefit of German Patent Application No. 10 2015 101 468.8 filed 2 Feb. 2015, the entire disclosure of each of which are hereby incorporated herein by reference.

FIELD OF THE INVENTION

The invention concerns a disk brake, preferably operated by compressed air, for a utility-vehicle wheel, with a brake caliper reaching around a brake disk which is arranged on the wheel rotational axis, an application device which is arranged in the brake caliper on the one side of the brake disk and can be actuated by means of a force member and preferably a compressed-air cylinder, brake pads on both sides of the brake disk, wherein at least the application-side brake pad is arranged in a pad duct having first and second supporting surfaces which have the same distance from a pad duct center line in the circumferential direction, and against which the brake pad lies with its edges pointing in the circumferential direction, a brake lever which is part of the application device and is composed of a lever arm supporting the force member, and an application shaft which is connected to the lever arm and mounted inside the brake caliper on a pivot axis and rests in a rotationally movable manner against a one- or multi-piece pressure piece working against the application-side brake pad.

BACKGROUND OF THE INVENTION

Disk brakes for utility vehicles with these features are known from EP 0 614 024 B1 and DE 42 30 005 A1. A brake caliper reaching over the brake disk and the brake pads holds an application device which can be actuated by a force member, e.g. a compressed-air cylinder, flanged onto the outside. A central component of the application device is a brake lever which is mounted pivotably in the brake caliper. This is composed of a lever arm, which supports the force member, and an application shaft. The application shaft at one end rests rotationally movably against the brake caliper housing, and at the other end rests rotationally movably against a pressure piece which is arranged so as to be longitudinally movable in the brake caliper and works directly or indirectly against the inner brake pad on the application side.

Usually, such disk brakes are designed symmetrically in the circumferential direction, since in particular pressure is applied to the two brake pads, and in particular to the inner brake pad on the application side, symmetrically in relation to the circumferential direction. Vehicles equipped with such brakes travel in everyday use almost exclusively in one direction, while the other direction of travel—normally assumed on reversing—occurs very rarely. The brake caliper must however press on the brake pads as evenly as possible, even though the direction of travel is always the same. This is because only in this case is the surface temperature the same across the entire brake pad. Local increases in pressure on the brake pad lead to temperature rises, associated with a reduction in the performance of the brakes and increased wear on the brake pad.

The problem of geometrically induced oblique wear on disk brakes (so-called circumferential oblique wear) is therefore known. For example, in the single-cylinder disk brake according to DE 42 30 005 A1, as a compensation measure it is proposed to configure the pressure transfer face acting on the inner brake pad at a slight angle or wedge-shaped, so that viewed in the circumferential direction, the pressure distribution is asymmetrical.

In the field of hydraulically actuated disk brakes in which the force member is usually a cylindrical hydraulic piston, previously efforts have focused on arranging the hydraulic piston offset tangentially in the brake caliper. The brake pressure exerted by the piston is not then applied to the geometric center of the brake pad, but its focal point is a geometric location which is slightly offset forward in the circumferential direction of the brake disk. Hydraulically actuated disk brakes with these features are known e.g. from DE 35 40 810 C1 or U.S. Pat. No. 4,533,025. The basic concept of simply arranging the piston transmitting the application force offset in the tangential direction cannot however easily be transferred to a disk brake operated by compressed air, with a brake lever arranged pivotably in the brake caliper housing.

The object of the invention is therefore to find measures which, above all in a compressed-air operated disk brake of the type cited initially, compensate for the geometrically induced oblique wear of the brake pads.

BRIEF SUMMARY OF THE INVENTION

For this, a disk brake is proposed with the features of claim 1.

In the disk brake configured in this way, the pivot axis of the application shaft is arranged at an angle to the main extension of the pad duct, i.e. to a line which extends between the two support surfaces at a right angle to the pad duct center line. In this way, the application shaft is arranged slightly tilted relative to the inner, i.e. application-side brake pad. This leads to a reduction in the geometrically induced oblique wear (circumferential oblique wear) of the disk brake, not only at the application-side brake pad but also at the other, preferably identical brake pad. A wear-optimized design is achieved, in which the durability of the brake pads is substantially higher than in a conventional system with central application in the area of the middle of the brake pads.

Preferably, the oblique position of the application shaft such that a—theoretical—transverse axis, running at a right angle to the middle of the length of the application shaft, precisely intersects the wheel rotational axis. The application shaft is thus tilted about the wheel rotational axis in relation to the pad duct. The lever arm and the crosspiece which supports the application shaft may also be tilted by the same angle. Preferably, all other components of the brake application system, including the compressed-air cylinder and its bolting to the brake caliper, are tilted by the same angle.

In a further embodiment, it is proposed that the pad duct center line intersects the wheel rotational axis.

According to a further embodiment, the pivot axis is arranged at an angle of between 2.5° and 7° to the main pad duct extension. Such a tilting of the application shaft has proved optimal for reducing the oblique wear at the brake pads.

In a further embodiment, it is proposed that the two support surfaces of the pad duct extend parallel to each other, and that the pivot axis is arranged at an angle to the surface normals standing perpendicular to the support surfaces.

It is furthermore proposed that the lever arm of the brake lever extends at a right angle to the pivot axis.

BRIEF DESCRIPTION OF THE DRAWINGS

The invention is now explained in more detail below with reference to exemplary embodiments shown in the drawings and the details contained therein. The drawings show.

DETAILED DESCRIPTION OF THE INVENTION

Figure 1:
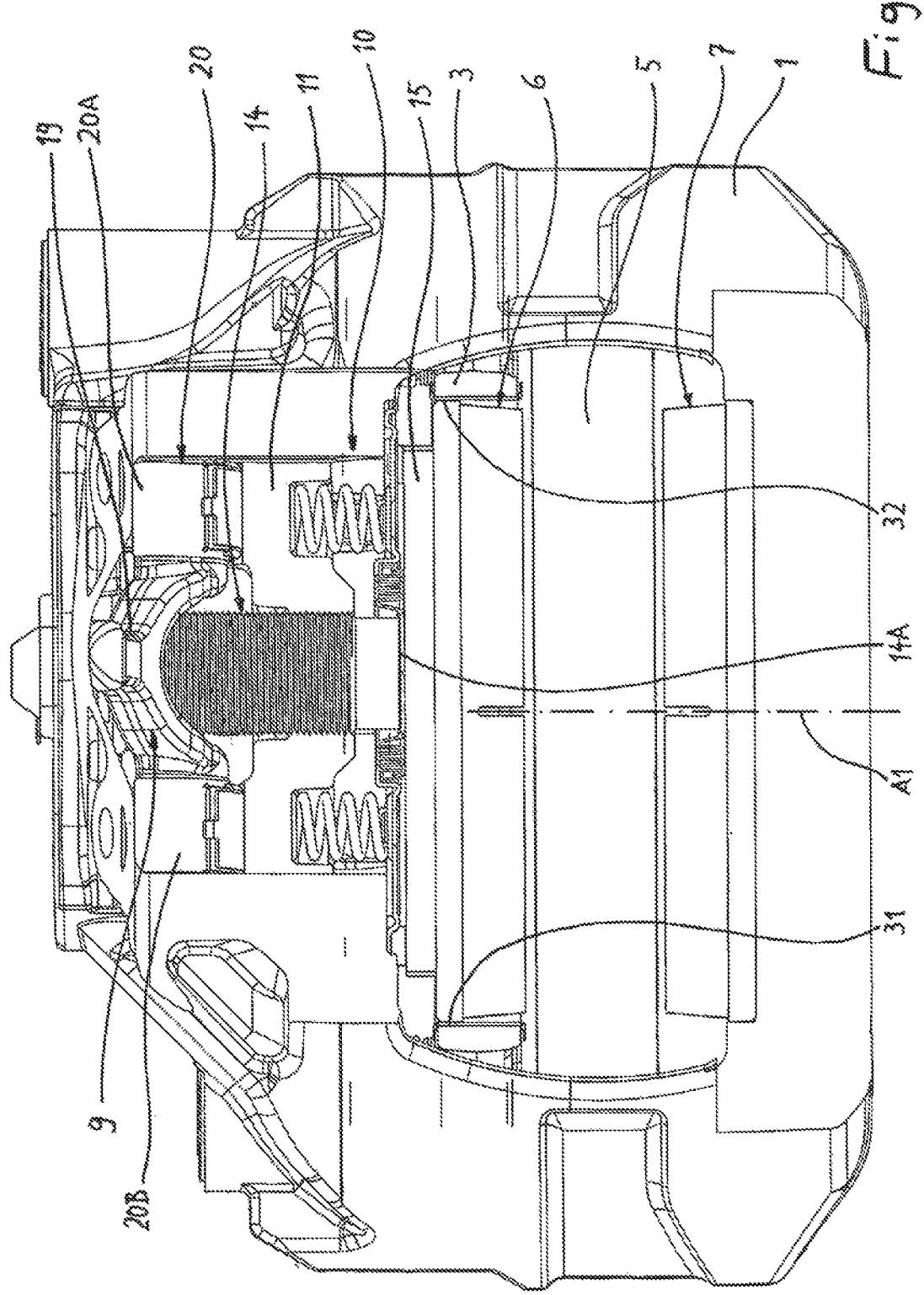
FIG. 1 a top view of a disk brake which can be actuated by compressed air, as may be used in particular in utility-vehicle brakes.

The drawings show a disk brake, as fitted in particular in a utility-vehicle brake actuated by compressed air. Components of the disk brake include a brake caliper 1, a brake disk 5 over which the brake caliper 1 reaches, and brake pads 6, 7 on both sides of the brake disk 5. The brake disk 5 is shown in dotted lines in FIG. 1 and is omitted in FIG. 2.

The disk brake works with unilateral application, i.e. the application force of an application device (to be described in more detail below) is transmitted directly to the brake pad 6 working from the inside of the vehicle against the brake disk 5, while the other brake pad 7 is pulled against the brake disk 5 by the resulting reaction force of the brake caliper 1. The design is therefore a floating caliper brake in which the brake disk 5 is immovable in the direction of the wheel rotational axis A1, while the brake caliper 1 is movable, in that the brake caliper is arranged so as to be displaceable in the direction of the wheel rotational axis A1 on a brake carrier 3, here attached to an axle tube 4.

The main components of the application device, the purpose of which above all is to amplify the brake forces generated by force member 8, are a brake lever 9 arranged pivotably inside the brake caliper 1, and a pressure piece 10 working against the inner brake pad 6 of the disk brake. The pressure piece 10 is formed from multiple pieces. In the disk brake described here, it consists of a crosspiece 11, a screw-fit spindle 14 and a pressure plate 15. Part of the pressure piece 10 is the crossmember 11, which extends over the width of the brake lever 9 and houses the spindle 14 which can be screwed into the crosspiece 11. The spindle 14 here has an external thread which is in turn supported against the stable pressure plate 15, which serves for pressure distribution and itself rests against the application-side brake pad 6.

Figure 2:
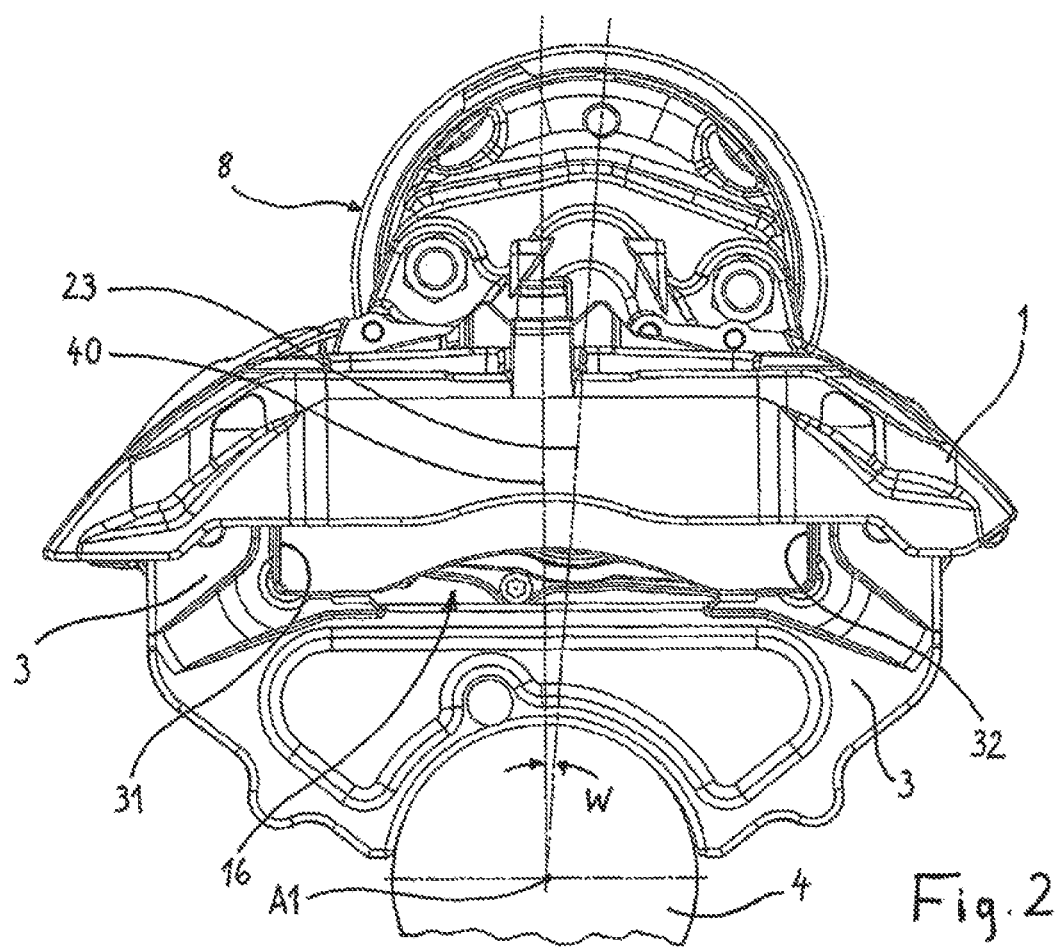
FIG. 2 a view of the disk brake in the direction of the wheel rotational axis, wherein also a compressed-air cylinder is shown which forms the force member of the disk brake.

The disk brake is constructed as a single-cylinder brake, since the entire application force is transmitted only via one spindle 14 and there is no parallel force flow path e.g. via a second spindle. Since the spindle 14 is rotatable for the purpose of adjusting the brake, its end face 14A facing the disk brake is circular. This end face 14A works either—as illustrated in FIG. 1—against the pressure plate 15 which distributes the application pressure particularly well over the entire face of the brake pad 6. Or the end face 14A rests directly against the brake pad 6—avoiding the pressure plate 15—and its back plate performs the task of pressure distribution.

The brake lever 9 is made as one piece with a lever arm 19 and an application shaft 20. The application shaft 20 rests on its back side against the brake caliper 1 from the inside. It is supported here via two rotary bearings. In the other direction, i.e. towards the brake pad 6 and the brake disk 5, the application shaft 20 is supported via two further rotary bearings against the crosspiece 11 which is provided with split bearings in this region.

The application shaft 20 is mounted eccentrically. The rear split bearings resting against the brake caliper 1 define a rotary bearing, which is offset in height relative to the rotary bearing of the split bearings resting against the crosspiece 11 towards the front. The two rotary bearings however extend precisely parallel to each other and are therefore referred to jointly below under the term "pivot axis A". Because of the eccentricity, when the application shaft 20 pivots, the pressure piece 10 moves forward in the direction towards the brake disk 5, so that the brake is applied.

The lever arm 19 serves to twist the application shaft 20 about the pivot axis A defined above. Its longitudinal axis 23 extends at a right angle to the pivot axis A. The lever arm 19 has a support at its outer end. This defines a support point against which the force member 8 of the disk brake works, i.e. here the pneumatic brake cylinder, flanged onto the brake caliper housing on the outside.

FIG. 1 shows a design of the application device in which the brake lever 9 as a whole is configured in the shape of a fork, and divides into two legs starting from the lever arm 19 arranged on the longitudinal axis 23. The one leg is connected to a first portion 20A and the other leg is connected to a second portion 20B of the application shaft 20. In this way, the brake lever 9 has a space between the two portions 20A, 20B in the extension of the lever arm 19, which offers space for the spindle 14 which can be screwed into the crosspiece 11.

On the inside, the spindle 14—serving as a central pressure piece of the application device—has a cavity which holds an adjustment device of the disk brake. The components of such an adjustment device are normally an input element, an output element reducing the air gap of the disk brake, and a one-way coupling and an overload member in the movement path between the input element and the output element. These components of the adjustment device are arranged on a common adjustment axis which coincides with the longitudinal axis of the spindle 14 and extends perpendicularly to the plane of the brake disk 5. The longitudinal and screw axis of the spindle 14 extends at a right angle to the pivot axis A of the application shaft 20.

The two brake pads 6, 7 are each arranged in brake ducts, wherein the brake ducts are configured to guide the brake pads parallel to the wheel rotational axis A1 and support them to receive the brake forces in the circumferential direction. In principle, it is possible to form the brake ducts either on the brake carrier 3 or on the brake caliper 1. In the disk brake described here, the brake duct 16 for the inner brake pad 6 is formed on the brake carrier 3, and the brake duct for the outer brake pad 7 is formed on the brake caliper 1 of the disk brake.

Figure 3:
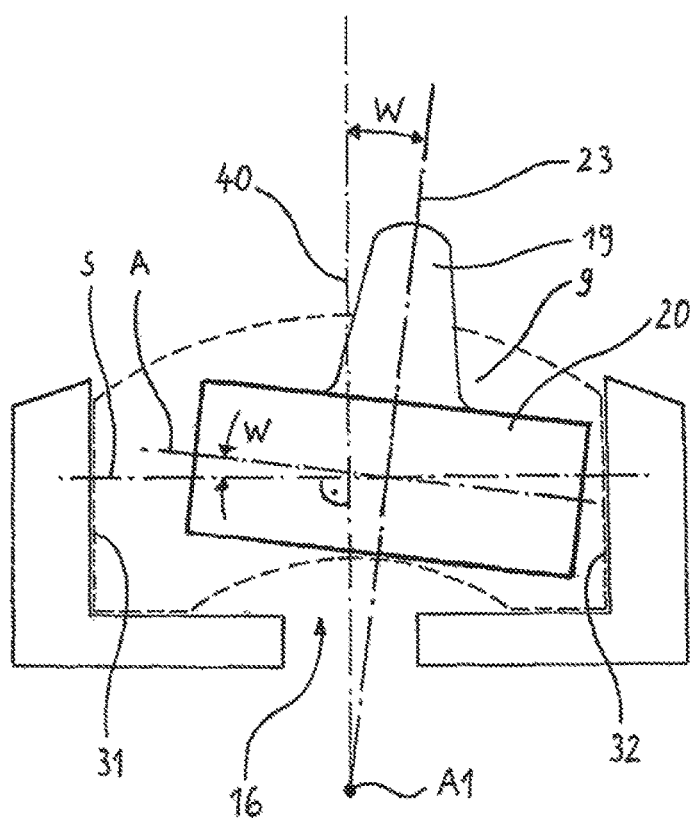
FIG. 3 a diagrammatic depiction of the arrangement of an application shaft arranged in the brake caliper housing of the disk brake in relation to a pad duct in which one of the two brake pads of the disk brake is received, and FIG. 4 in a second embodiment, a diagrammatic depiction of the arrangement of an application shaft arranged in the brake caliper housing of the disk brake in relation to a brake duct in which one of the two brake pads of the disk brake is received.

FIG. 3 shows, in a diagrammatic depiction, the geometric arrangement of the brake lever 9 and in particular the application shaft 20 in relation to the inner pad duct 16 and the application-side brake pad 6 sitting therein. The pad duct 16 is formed substantially rectangular and has a first support surface 31 and a second support surface 32, against which the brake pad 6 lies with its edges pointing in the circumferential direction, in order thus to dissipate the majority of the braking moments to the brake duct 16 and hence to the brake carrier 3. The geometric conditions are such that the two support surfaces 31, 32 have the same distance from the pad duct center line 40 in the circumferential direction, wherein this pad duct center line 40 intersects the wheel rotational axis A1.

To reduce the oblique wear at the brake pad, the pivot axis A of the application shaft 20 is arranged at an angle to the main extension S of the pad duct 16, i.e. obliquely to a line which extends between the two support surfaces 31, 32 at a right angle to the pad duct center line 40. Under these geometric conditions, the application shaft 20 is arranged slightly tilted in relation to the inner application-side brake pad 6.

This design leads to a reduction in the geometrically induced oblique wear (circumferential oblique wear) of the disk brake, not only for the brake pad 6 on the application side but also on the other, identical brake pad 7. A wear-optimized design is achieved, in which the durability of the brake pads is substantially higher than in a conventional system with central application in the area of the middle of the brake pads. The angle W, at which the pivot axis A is arranged obliquely to the main extension S of the pad duct 16, lies between 2.5° and 7°, preferably 3.5° to 6°.

Also, the oblique position of the application shaft 20 is such that a—theoretical—transverse axis 23, running at a right angle to the middle of the length of the application shaft 20, precisely intersects the wheel rotational axis A1. The application shaft 20 is therefore tilted about the wheel rotational axis A1 by angle W relative to the pad duct 16, and the transverse axis 23 extends at an angle W to the pad duct center line 40.

The lever arm 19 and the crosspiece 11 which supports the application shaft may also be tilted by this angle W.

Preferably, all other components of the brake application system, including the compressed-air cylinder 8 and its bolting to the brake caliper, are also tilted by the angle W.

In FIG. 3, the two support surfaces 31, 32 formed on the pad duct 16 extend parallel to each other, and the pivot axis A is arranged at an angle to the surface normals standing perpendicular to the support surfaces 31, 32.

Figure 4:
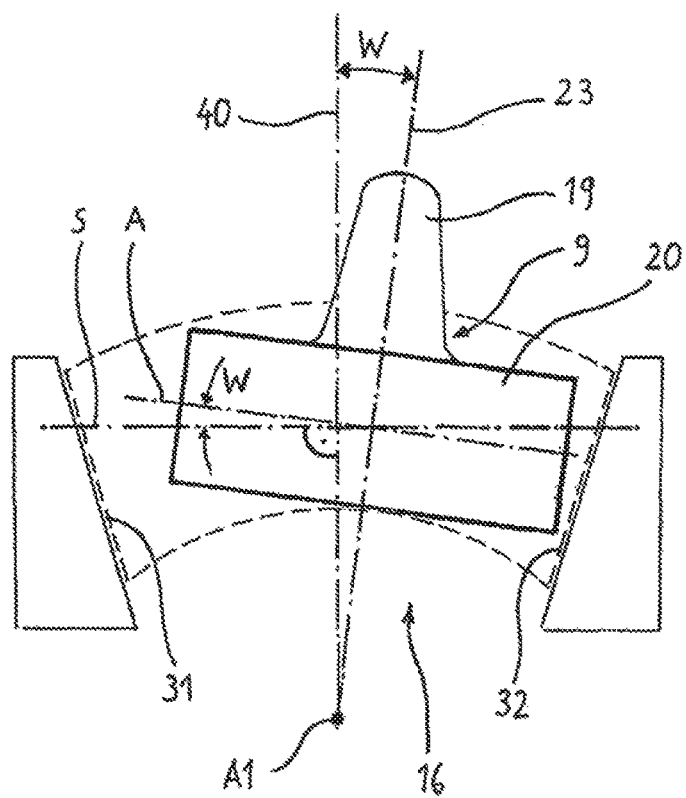

FIG. 4—also in a highly diagrammatic depiction—shows a derived embodiment. Here, the pad duct 16 for the brake pad 6 is not rectangular, but the support surfaces 31, 32 of the pad ducts 16 run obliquely and not parallel to each other. The edges of the brake pad 6, in contact with the support surfaces 31, 32 and dissipating the brake moments, are designed accordingly.

In the embodiment according to FIG. 4, the pivot axis A of the application shaft 20 is again arranged obliquely, at an angle W of between 2.5° and 7°, to the main extension S which extends between the two support surfaces 31, 32 at a right angle to the pad duct center line 40.

The second pad duct for brake pad 7, arranged on the far side of the brake disk 5, lies precisely opposite the first pad duct 16, i.e. its pad duct center line 40 also intersects wheel rotational axis A1, and it is not arranged offset to the first pad duct 16 in the circumferential direction. The second pad duct has the same dimensions so it can receive a brake pad 7 without a profile identical to that of the brake pad 6. The two brake pads 6, 7 are therefore identical and hence interchangeable.

LIST OF REFERENCE SYMBOLS

1 Brake caliper
3 Brake carrier
4 Axle tube
5 Brake disk
6 Brake pad
7 Brake pad
8 Force member, compressed air cylinder
9 Brake lever
10 Pressure piece
11 Crosspiece
14 Spindle
14A End face
15 Pressure plate
16 Pad duct
19 Lever arm
20 Application shaft
20A Portion of application shaft
20B Portion of application shaft
21 Support surface
23 Transverse axis, longitudinal axis of lever arm
31 Support surface
32 Support surface
40 Pad duct center line
A Pivot axis
A1 Wheel rotational axis
S Main extension of pad duct
W Angle

The invention claimed is:

1. A disk brake for a utility-vehicle wheel, comprising:
a brake caliper reaching around a brake disk which is arranged on the wheel rotational axis;
an application device which is arranged in the brake caliper on one side of the brake disk and can be actuated by means of a force member;
brake pads on both sides of the brake disk, the brake pads including an application-side brake pad, wherein at least the application-side brake pad is arranged in a pad duct having first and second supporting surfaces which have the same distance from a pad duct center line in the circumferential direction, and against which the application-side brake pad lies with its edges pointing in the circumferential direction;
a brake lever which is part of the application device and comprises a lever arm supporting the force member, and an application shaft which is connected to the lever arm and mounted inside the brake caliper on a pivot axis and rests in a rotationally movable manner against a one- or multi-piece pressure piece working against the application-side brake pad,
wherein the pivot axis of the application shaft is arranged at an angle to the main pad duct extension which extends between the two supporting surfaces at a right angle to the pad duct center line, and wherein a theoretical transverse axis, running at a right angle to the center of the length of the application shaft, intersects the wheel rotational axis.

2. The disk brake as claimed in claim 1, wherein the pad duct center line intersects the wheel rotational axis.

3. The brake disk as claimed in claim 1, wherein the pivot axis is arranged at an angle of between 2.5° and 7° to the main pad duct extension.

4. The disk brake as claimed in claim 1, wherein the lever arm and the crossmember which supports the application shaft are also arranged tilted by the angle.

5. The disk brake as claimed in claim 1, wherein the longitudinal axis of the lever arm of the brake lever extends at a right angle to the pivot axis.

6. The disk brake as claimed in claim 1, wherein the pad ducts of the two brake pads are arranged precisely opposite each other with no mutual offset in the circumferential direction.

7. The disk brake as claimed in claim 6, wherein the two brake pads are identical.

8. The disk brake as claimed in claim 1, wherein part of the multipiece pressure piece is a spindle rotatable about its longitudinal axis, and wherein the spindle facing the brake disk has a circular end face as a pressure transfer face.

9. The disk brake as claimed in claim 8, characterized by a pressure plate serving for pressure distribution between the end face of the spindle and the brake pad.

10. The disk brake as claimed in claim 1, wherein the force member comprises a compressed air cylinder.

* * * * *